(12) United States Patent
Li et al.

(10) Patent No.: US 8,900,505 B2
(45) Date of Patent: Dec. 2, 2014

(54) METHOD OF MAKING AN INVERTED-HOOK GROOVE FOR A PLANT-FIBER MOLDED CUP LID

(75) Inventors: Tingnan Li, Suzhou (CN); Tzungshen Lai, Suzhou (CN)

(73) Assignee: Faith Viva Limited, Tortola (VG)

( * ) Notice: Subject to any disclaimer, the term of this patent is extended or adjusted under 35 U.S.C. 154(b) by 245 days.

(21) Appl. No.: 13/123,242

(22) PCT Filed: Jul. 23, 2009

(86) PCT No.: PCT/CN2009/000826
§ 371 (c)(1),
(2), (4) Date: Apr. 8, 2011

(87) PCT Pub. No.: WO2011/009229
PCT Pub. Date: Jan. 27, 2011

(65) Prior Publication Data
US 2011/0193264 A1    Aug. 11, 2011

(51) Int. Cl.
| | |
|---|---|
| B29C 43/04 | (2006.01) |
| B29C 43/00 | (2006.01) |
| B29C 43/36 | (2006.01) |
| B29K 105/26 | (2006.01) |
| B29L 1/00 | (2006.01) |
| B29L 31/56 | (2006.01) |
| B29L 31/00 | (2006.01) |

(52) U.S. Cl.
CPC ............... *B29C 43/003* (2013.01); *B29C 43/36* (2013.01); *B29C 43/3642* (2013.01); *B29C 2043/3626* (2013.01); *B29C 2043/3649* (2013.01); *B29C 2043/3665* (2013.01); *B29K 2105/26* (2013.01); *B29K 2995/0056* (2013.01); *B29K 2995/006* (2013.01); *B29L 2001/00* (2013.01); *B29L 2031/565* (2013.01); *B29L 2031/712* (2013.01)

USPC ............................ 264/299; 264/318; 264/320

(58) Field of Classification Search
USPC ...................... 264/299, 318, 320; 249/64, 142
See application file for complete search history.

(56) References Cited

U.S. PATENT DOCUMENTS 4,286,766 A * 9/1981 von Holdt ...................... 249/144

FOREIGN PATENT DOCUMENTS

| CN | 20091015766.6 A | 7/2012 |
|---|---|---|
| JP | 2006-062743 A | 3/2006 |
| JP | 5340477 A | 8/2013 |

OTHER PUBLICATIONS

Examiner's report issued in the corresponding Japanese and Chinese applications dated Mar. 26, 2013.
Examiner's report issued in the corresponding Japanese and Chinese applications dated Mar. 26, 2013 and English language translation of same.

* cited by examiner

*Primary Examiner* — James Sanders
(74) *Attorney, Agent, or Firm* — Bacon & Thomas, PLLC

(57) ABSTRACT

A method of making an inverted-hook groove for a plant fiber-molded cup lid is to form an inverted-hook groove on a side surface of a plant-fiber molded cup lid, which has already been thermally compressed and shaped, processed and shaped once more to form an inverted-hook groove at the side surface of the molded cup lid so that the molded cup lid with the inverted-hook groove can be tightly and closely combined with the upper edge of a primary cup body. The method of making an inverted-hook groove for a plant-fiber molded cup lid of this invention is classified into three kinds; a method of compression shaping directly, a method of roller compression shaping and a method of air bag compression shaping.

3 Claims, 5 Drawing Sheets

(A)

(B)

(C)

METHOD OF MAKING AN INVERTED-HOOK GROOVE FOR A PLANT-FIBER MOLDED CUP LID

BACKGROUND OF THE INVENTION

1. Field of the Invention

This invention relates to a method of making an inverted-hook groove for a plant-fiber molded cup lid, particularly to one of forming an inverted-hook groove around the side edge of the plant-fiber molded cup lid that is thermally compressed and shaped. Thus, the plant-fiber molded cup lid formed with an inverted-hook groove can be tightly and closely combined with the upper edge of a primary cup body.

2. Description of the Prior Art

A so-called "plant-fiber molded cup lid" is made of plant fiber, which is mostly made of paper pulp, but other composite materials of plant fiber are also available. A cup lid formed by compression molding is commonly called as a "paper molded cup lid." At present, in plant fiber (paper pulp) molding trade, shaping (molding) of a product is carried out in two ways of thermal pressure. The first way is to have an unfinished paper-pulp molded cup lid thermally compressed by means of thermal compressing-shaping equipment when the water content of the molded cup lid is about 55-70%. The temperature of thermal compression is 150° C.±10° C. and the time of thermal compression depends on the volume, that is, the larger the volume is, the longer the time of thermal compression must be. Generally, the time of thermal compression for a paper-pulp molded cup lid is 45 s±5 s. The second way is to have an unfinished paper-pulp molded cup lid dried by heat when the water content of the cup lid is about 55-70%, and then let the cup lid thermally compressed and shaped when its water content rate drops to 7-10%. The temperature of thermal compression is 150° C.±10° C., which is the same as that of the first way, but the time of thermal compression is shorter than that of the first way. Substantially, thermal compressing and shaping is a technique customarily employed for carrying out molding of plant fiber (paper pulp). For carrying out thermal compression molding work, it is necessary to employ an upper mold and a lower mold that are tightly closed together, and the upper and the lower mold have to be moved for a distance when they are closed and opened; therefore, in order to release a shaped product from the mold smoothly, the interior of the shaped product cannot produce a structure of negative angle. As a result, a paper-pulp molded cup lid cannot produce an inverted-hook groove to be tightly and closely combined with the upper edge of a cup body.

SUMMARY OF THE INVENTION

The objective of this invention is to offer a method of making an inward-recessed inverted-hook groove around the side edge of a plant-fiber molded cup lid so that the molded cup lid with an inverted-hook groove can be firmly and closely combined with the upper edge of a primary cup body.

A first method of making an inverted-hook groove for a plant fiber-molded cup lid in the present invention is to have the outer side of a thermally compressed and shaped plant fiber-molded cup lid covered with an outer mold that matches the profile of the molded cup lid. The outer mold is bored with a transversely annular slide groove corresponding with an inverted-hook groove of the molded cup lid, and a set of shaping slide blocks is received in the annular slide groove, and each slide block is formed with a protruding-out shaping ridge at an inner edge. The molded cup lid has its interior receiving an inner mold that has a central portion receiving a material-propping block, with the inner mold and the material-propping block matching the profile of the molded cup lid. The inner mold is formed with an annularly inward-recessed receiving groove corresponding with the inverted-hook groove of the molded cup lid, the position and the shape of the receiving groove correspondingly matching the shaping ridge. During making an inverted-hook groove, the outer mold and the inner mold together with the material-propping block are first closed together with the molded cup lid and then, the slide blocks are pushed to move inward to let their shaping ridge resist the surface of the molded cup lid and move forward continuously to make the surface of the molded cup lid deformed together with the shape of the shaping ridge and contracted into the receiving groove of the inner mold to form an annular inverted-hook groove.

After the molded cup lid is formed with an annular inverted-hook groove on the surface, the slide blocks are withdrawn outward, the outer mold and the inner mold are opened reversely, and meanwhile the material-propping block is actuated to push out the molded cup lid formed with the inverted-hook groove. Further, when the shaping ridge of the slide blocks are moved forward together, all of the shaping ridges can be conjoined into an annular shape.

A second method of making an inverted-hook groove for a plant fiber-molded cup lid in the present invention is to have the outer side of a thermally compressed and shaped plant fiber-molded cup lid covered with an outer mold for pressing the molded cup lid. A shaping roller is positioned to abut and resist an outer side of a location where the molded cup lid is to be formed with an inverted-hook groove and is disposed with a protruding-out shaping ridge facing where the inverted-hook groove is to be formed. The molded cup lid has its interior receiving an inner mold that has a central portion receiving a material-propping block, with the upper surface of the inner mold and the material-propping block corresponding with the profile of the molded cup lid, and with the inner mold provided with an annular recessed receiving groove facing to where the inverted-hook groove to be formed. And the location and the shape of the annular recessed receiving groove correspond to those of the shaping ridge. When an inverted-hook groove is to be formed, the outer mold and the inner mold together with the material-propping block are first closed with the molded cup lid. Subsequently, the shaping roller is moved inward and has its shaping ridge resisting against the surface of the molded cup lid and moving forward continuously to make the surface of the molded cup lid deformed together with the shape of the shaping ridge and contracted into the receiving groove of the inner mold. Then, the shaping roller is driven to move around the surface of the molded cup lid for at least one round to form the inverted-hook groove.

After the molded cup lid is formed with an inverted-hook groove on the surface, the shaping roller is withdrawn outward, and the outer mold and the inner mold are opened reversely and then, the material-propping block is forced to push out the molded cup lid that is formed with the inverted-hook groove.

Further, the shaping roller in the present invention can be more than one.

A third method of making an inverted-hook groove for a plant fiber-molded cup lid in the present invention is to have the upper side of a thermally compressed and shaped plant-fiber molded cup lid mounted with a fixing base that is covered and pressed on an air bag, letting the air bag face the upper side of the molded cup lid. The air bag is formed with an air intake extending out of the fixing base. The molded cup lid has its lower side receiving an inner mold that has a central portion receiving a material-propping block, with the upper side of the inner mold and the material-propping block matched the lower side of the molded cup lid. The inner mold is provided with an annularly inward-recessed receiving groove corresponding with a location where the molded cup lid is to be formed with an inverted-hook groove. When an inverted-hook groove is to be made, firstly, the fixing base together with the air bag is covered on the upper side of the molded cup lid, and the inner mold and the material-propping block are closed with the lower side of the molded cup lid. Then, high-pressure air is pumped into the air bag through the air intake to make the air bag fully inflated and stuffed in the space between the molded cup lid and the air bag, letting the force of the high-pressure air press the surface of the molded cup lid to be deformed and contracted into the receiving groove of the inner mold, thus finishing forming an inverted-hook groove on the surface of the molded cup lid.

After the annular inverted-hook groove is formed on the surface of the molded cup lid, high-pressure air in the air bag is actuated to leak out, letting the surface of the air bag separate from the upper side of the molded cup lid, and then the inner mold is opened reversely and the material-propping block is actuated to push out the molded cup lid that is already formed with the inverted-hook groove. Additionally, the air pressure of air pumped in the air bag is 0.6-0.8 MPa and the time of air inflating is about 3 seconds.

BRIEF DESCRIPTION OF DRAWINGS

This invention will be better understood by referring to the accompanying drawings, wherein.

DETAILED DESCRIPTION OF THE PREFERRED EMBODIMENT

A method of making an inverted-hook groove for a plant fiber-molded cup lid in the present invention is to have a plant-fiber molded cup lid, which has already been thermally compressed and shaped, processed and shaped for a second time under normal temperature to form an inverted-hook groove around the side edge of the molded cup lid so that the molded cup lid can be tightly and closely combined with the upper edge of a primary cup body. Therefore, the manufacturing process of a plant fiber-molded cup lid with no negative angle will no longer go into details. Methods of making an inverted-hook groove around the side edge of a plant fiber-molded cup lid that has already been thermally compressed and shaped in the present invention are to be described as follows.

Figure 1:
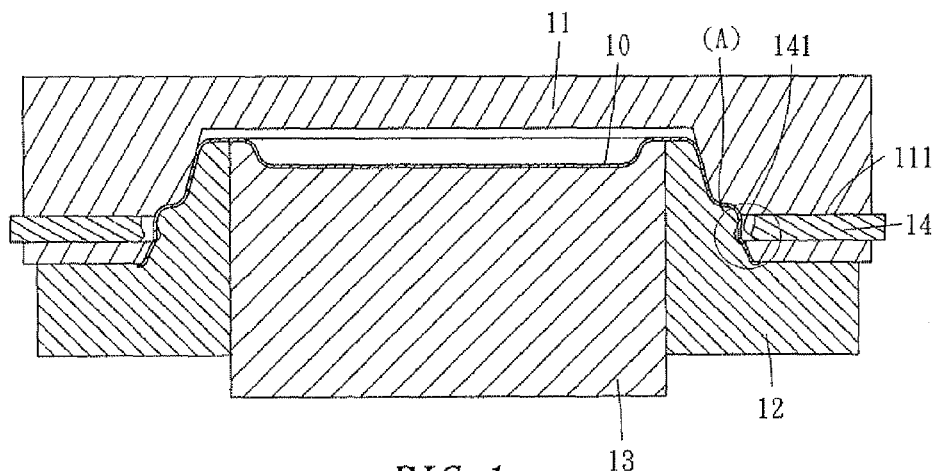
FIG. 1 is a cross-sectional view of a first preferred embodiment of a method of making an inverted-hook groove for a plant fiber-molded cup lid in an action of closing a mold in the present invention.
Figure 2:
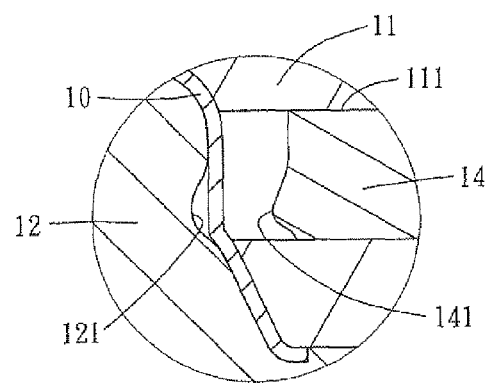
FIG. 2 is a partial cross-sectional view of the section marked (A) in FIG. 1.
Figure 4:
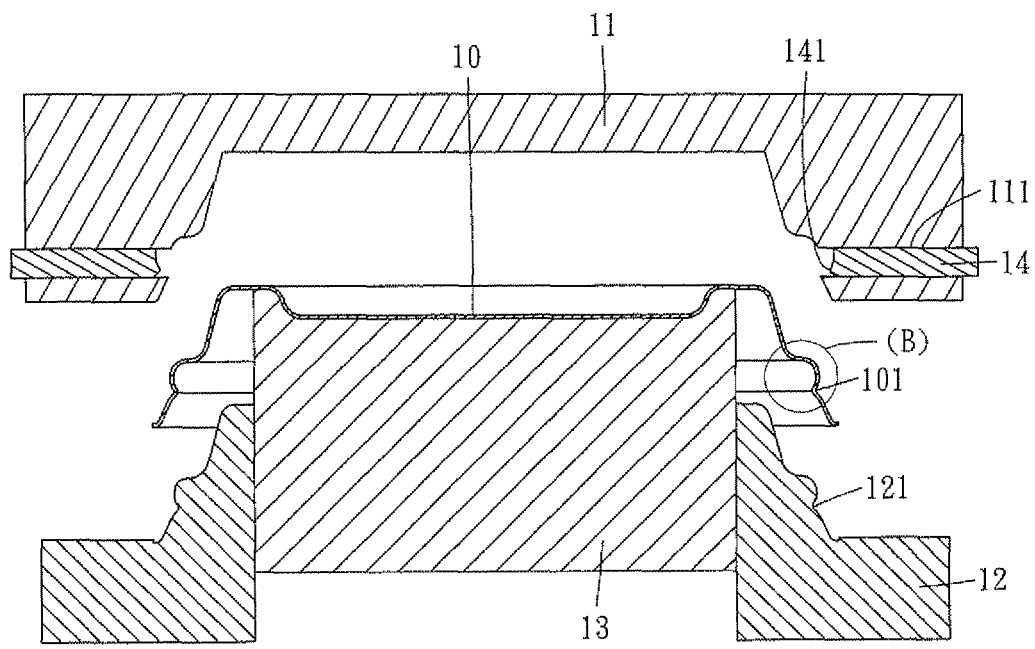
FIG. 4 is a cross-sectional view of the first preferred embodiment of the method of making an inverted-hook groove for a plant fiber-molded cup lid in an action of opening the mold in the present invention.
Figure 5:
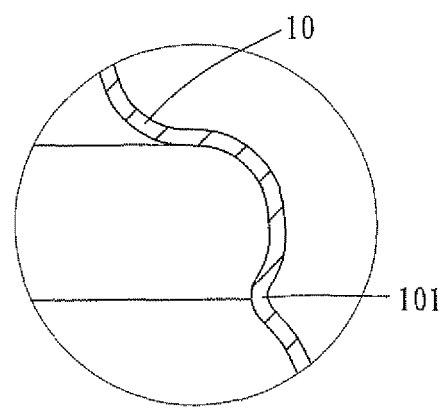
FIG. 5 is a partial magnified view of the (B) in FIG. 4.

A first preferred embodiment of a method of making an inverted-hook groove for a plant fiber-molded cup lid in the present invention, as shown in FIGS. 1 and 2, is to have the outer side of a thermally shaped plant-fiber molded cup lid 10, which is not yet formed with any negative angle, covered with an outer mold 11 that is matched the profile of the molded cup lid 10. The outer mold 11 is correspondingly cut with a transversely annular slide groove 111 at a location where the molded cup lid 10 is to be formed with an inverted-hook groove 101, as shown in FIGS. 4 and 5. A set of slide blocks 14 for shaping is received in the slide groove 111 and each slide block 14 has its inner edge formed with a protruding-out shaping ridge 141 and thus, when moved inward together, all of the shaping ridges 141 of the slide blocks 14 will be conjoined into an annular shape. The molded cup lid 10 has its interior receiving an inner mold 12 and its central portion receiving a material-propping block 13, and the upper surface of the inner mold 12 and the material-propping block 13 must match the lower side of the molded cup lid 10. Referring to FIGS. 4 and 5, the inner mold 12 is formed with an annularly inward-recessed receiving groove 121 at a place corresponding with the inverted-hook groove of the molded cup lid 10, as shown in FIG. 2, and the location and the outline of the receiving groove 121 must correspond with those of the shaping ridges 141.

Figure 3:
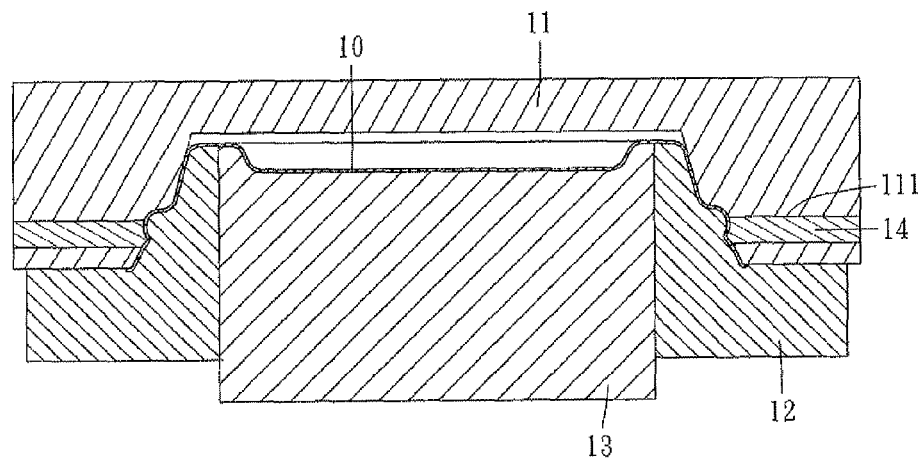
FIG. 3 is a cross-sectional view of the first preferred embodiment of the method of making an inverted-hook groove for a plant fiber-mold cup in a shaping action in the present invention.

Thus, after the outer mold 11 and the inner mold 12 together with the material-propping block 13 are closed with the molded cup lid to form a state shown in FIG. 1, the slide blocks 14 are pushed to move inward by external power, such as a power cylinder, to let their shaping ridges 141 together resist the surface of the molded cup lid 10 and move forward continuously to make the surface of the molded cup lid 10 deformed together with the shape of the shaping ridge 141 and contracted into the receiving groove 121 of the inner mold 12 to form the annular inverted-hook groove 101, as shown in FIG. 3. Subsequently, referring to FIG. 4, the slide blocks 14 are pulled by external power to withdraw outward quickly, the outer mold 11 and the inner mold 12 are opened reversely, and then the material-propping block 13 is actuated to push out the molded cup lid 10 formed with an inverted-hook groove 101, as shown in FIGS. 4 and 5.

Figure 6:
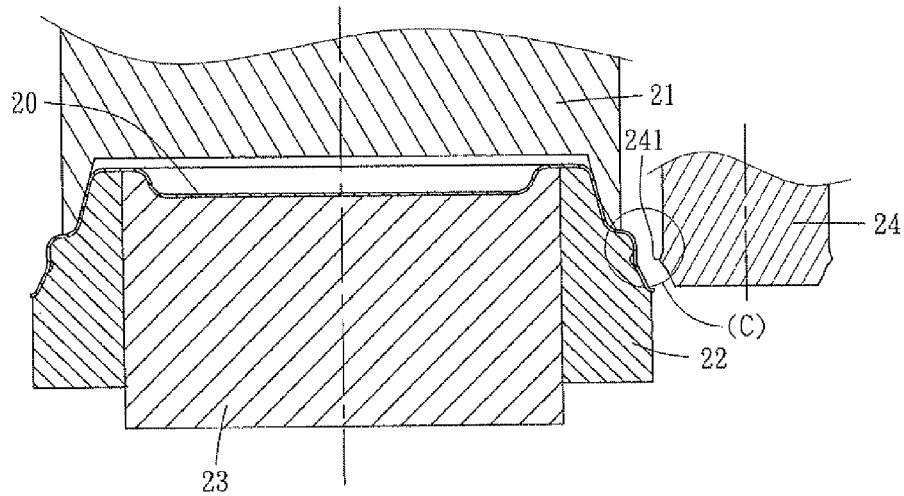
FIG. 6 is a cross-sectional view of a second preferred embodiment a method of making an inverted-hook groove for a plant fiber-molded cup lid in an action of closing the mold in the present invention.
Figure 7:
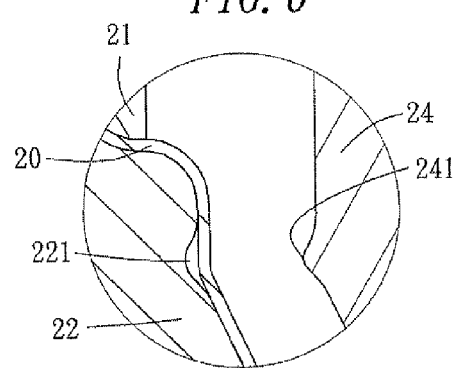
FIG. 7 is a partial magnified view of the section marked (C) in FIG. 6.
Figure 9:
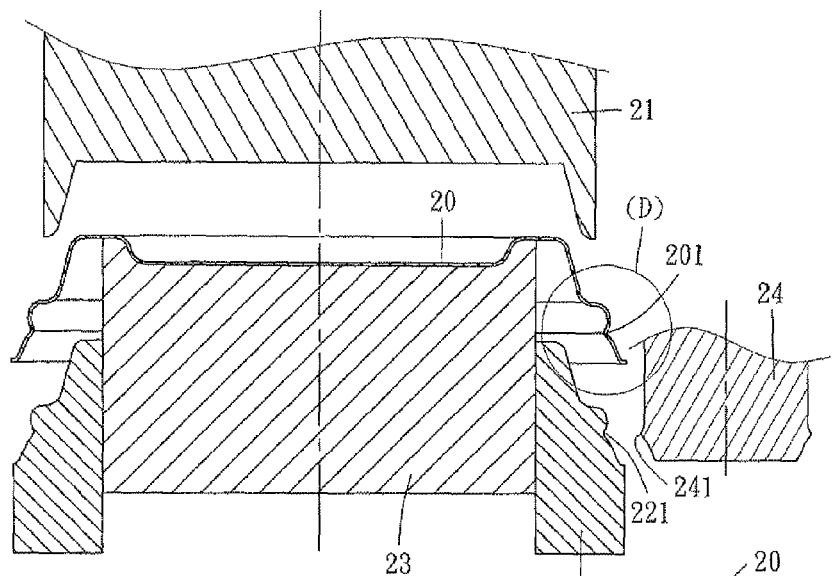
FIG. 9 is a cross-sectional view of the second preferred embodiment of the method of making an inverted-hook groove for a plant fiber-molded cup lid in an action of opening the mold in the present invention.
Figure 10:
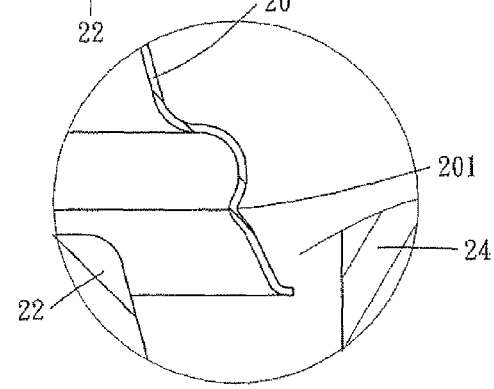
FIG. 10 is a partial magnified view of the section marked (D) in FIG. 9.

A second preferred embodiment of a method of making an inverted-hook groove for a plant-fiber molded cup lid in the present invention is to use roller compressing and shaping. Referring to FIGS. 6 and 7, a thermally compressed and shaped plant fiber-molded cup lid 20, which is not yet formed with any negative angle, has its upper side covered with an outer mold 21 for pressing the molded cup lid 20. A space not pressed by the outer mold 21 is reserved at an outer side of a location where the molded cup lid 20 is to be formed with an inverted-hook groove 201, as shown in FIGS. 9 and 10, and a shaping roller 24 is positioned to abut and resist against the space. The shaping roller 24 (one or plural) is formed with a protruding-out shaping ridge 241 facing a location where the inverted-hook groove 201 of the molded cup lid is to be formed. The molded cup lid 20 has its interior receiving an inner mold 22 that has a central portion receiving a material-propping block 23, and the inner mold 22 and the material-propping block 23 have to tally with the profile of the molded cup lid 20. The inner mold 22 is provided with an annularly inward-recessed receiving groove 221 at a place corresponding with a location where the inverted-hook groove 201 of the molded cup lid 20 is to be formed, as shown in FIGS. 7, 9 and 10, and the position and the shape of the receiving groove 221 must correspond with those of the shaping ridge 241.

Figure 8:
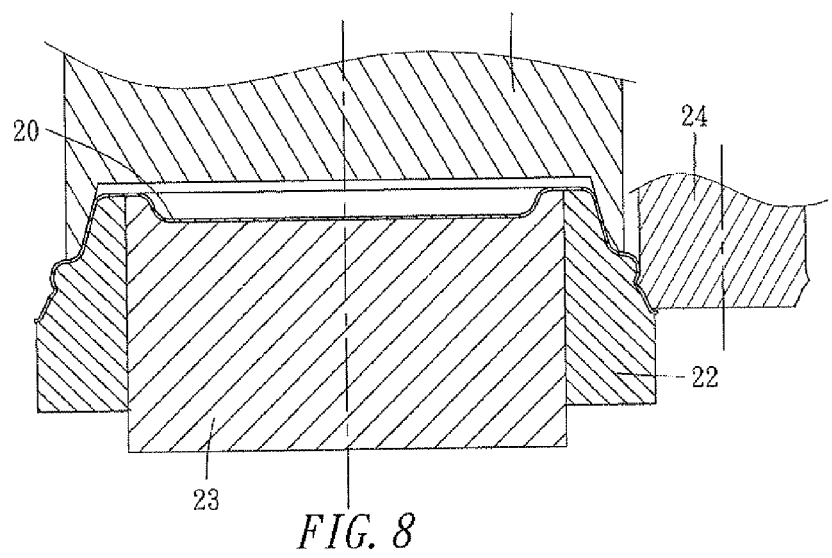
FIG. 8 is a cross-sectional view of the second preferred embodiment of the method of making an inverted-hook groove for a plant fiber-molded cup lid in a shaping action in the present invention.

According to foresaid constitution, after the outer mold 21 and the inner mold 22 together with the material-propping block 23 are closed with the molded cup lid to form a state shown in FIG. 6, the shaping roller 24 is pushed by external power, such as a power cylinder, to move inward to let its shaping ridge 241 resist the surface of the molded cup lid 20 and move forward continuously to make the surface of the molded cup lid 20 deformed together with the shape of the shaping ridge 241 and contracted into the receiving groove 221 of the inner mold 22. Then, the shaping roller 24 is driven to turn around the outer surface of the molded cup lid 20 for at least one round to form the inverted-hook groove 201, as shown in FIG. 8. Afterward, referring to FIG. 9, the shaping roller 24 is pulled to withdraw outward, the outer mold 21 and the inner mold 22 are reversely opened, and meanwhile the material-propping block 23 is actuated to push out the molded cup lid 20 that is already formed with the inverted-hook groove 201, as shown in FIGS. 9 and 10.

Figure 11:
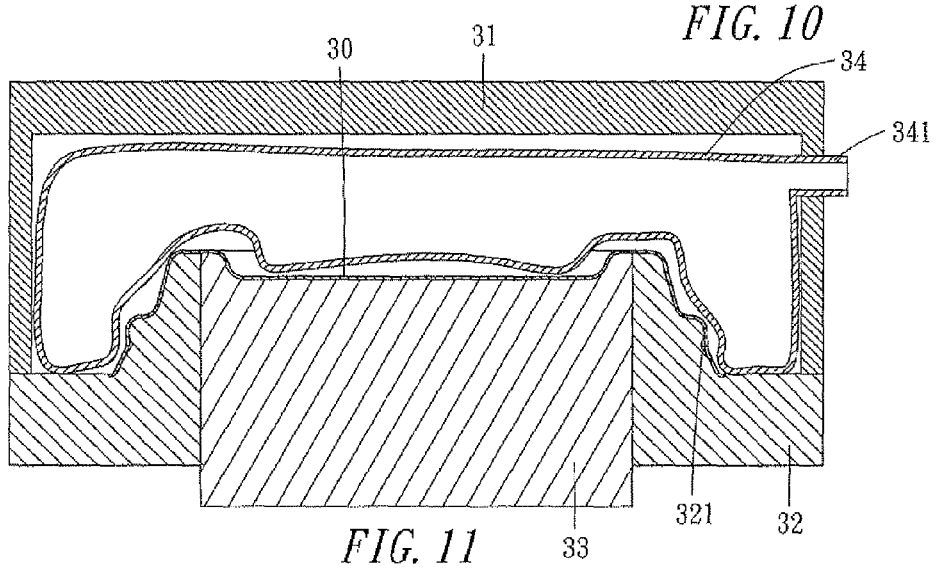
FIG. 11 is a cross-sectional view of a third preferred embodiment of a method of making an inverted-hook groove for a plane fiber-molded cup lid in an action of closing the mold in the present invention.
Figure 13:
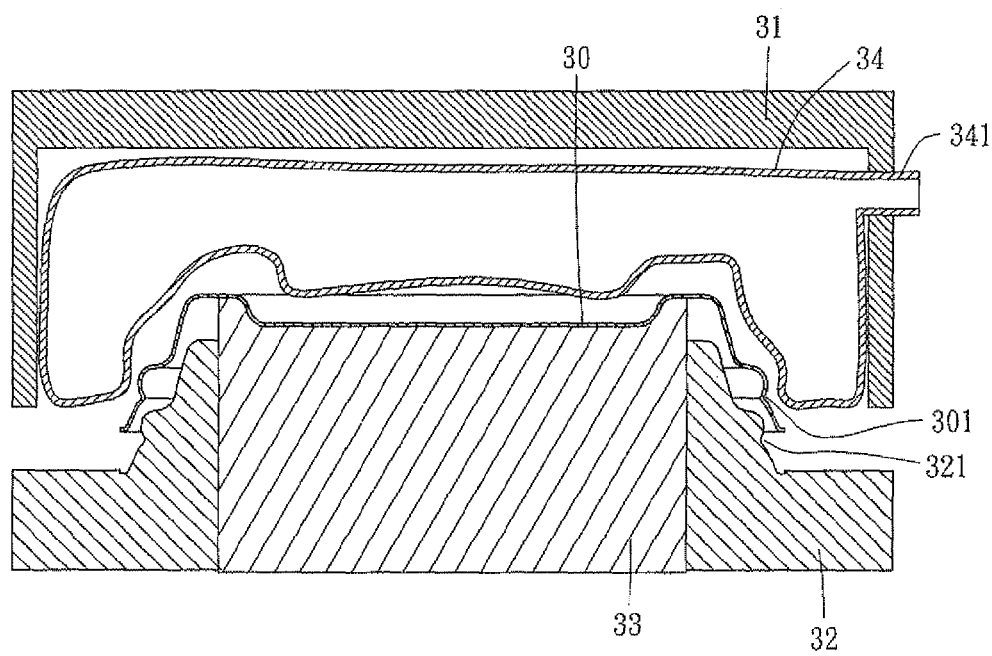
FIG. 13 is a cross-sectional view of the third preferred embodiment of the method of making an inverted-hook groove for a plant fiber-molded cup lid in an action of opening the mold in the present invention.

A third preferred embodiment of a method of making an inverted-hook groove for a plant fiber-molded cup lid in the present invention is to use airbag compressing and shaping. Referring to FIG. 11, a thermally compressed and shaped plant fiber-molded cup lid 30 without forming any negative angle has its outer side mounted with a fixing base 31 that is covered on an air bag 34, letting the air bag 34 face the upper surface of the molded cup lid 30. The air bag 34 is formed with an air intake 341 extending out of the fixing base 31. The molded cup lid 30 has its inside receiving an inner mold 32 that has a center portion receiving a material-propping block 33, with the inner mold 32 and the material-propping block 33 necessary to match the shape of the molded cup lid 30. The inner mold 32 is disposed with an annularly inward-recessed receiving groove 321 corresponding with the location where the inverted-hook groove 301 of the molded cup lid 30 is to be formed, as shown in FIG. 13.

Figure 12:
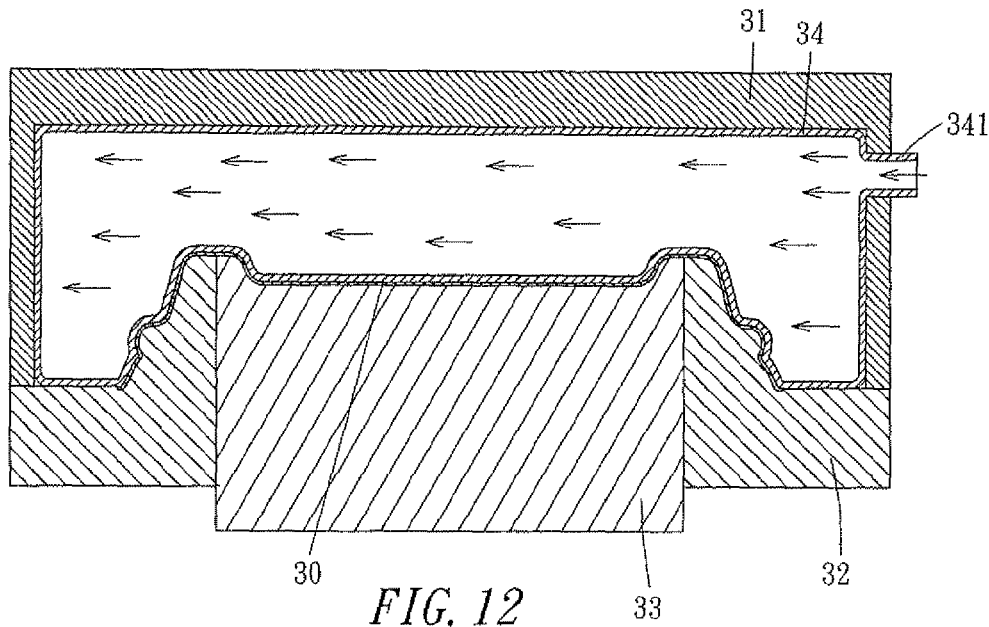
FIG. 12 is a schematic view of the third preferred embodiment of the method of making an inverted-hook groove for a plant fiber-molded cup lid in a shaping action in the present invention.

By so designing, when the fixing base 31 together with the air bag 34 (not yet inflated) is covered on the upper side of the molded cup lid 30, the inner mold 32 and the material-propping block 33 will also be closed with the lower side of the molded cup lid 30 to form a state shown in FIG. 11. Then, high-pressure air is pumped into the air bag bag 34 through the air intake 341 by external power, such as an air compressor, (air pressure being 0.6-0.8 MPa and the time of inflating being about 3 seconds), to let the air bag 34 fully inflate (serving as an outer mold) and stuffed into the space between the molded cup lid 30 and the air bag 34. At this time, the force of the high-pressure air will push the upper surface of the molded cup lid 30 to be deformed and contracted into the receiving groove 321 of the inner mold 32 to form an annular inverted-hook groove 301 on the surface of the molded cup lid 30, as shown in FIG. 12. Then, referring to FIG. 13, release the high-pressure air from the air bag 34 so as to let the air bag 34 quickly separate from the upper surface of the molded cup lid 30 (like an action of opening an outer mold), and the inner mold 32 is released from the molded cup cup lid 30 and simultaneously the material-propping block 33 is actuated to push out the molded cup lid 30 that is already formed with the inverted-hook groove 301.

As can be understood from the above description, the method of making an inverted-hook groove for a plant fiber-molded cup lid in the present invention is to have a thermally compressed and shaped plant fiber-molded cup lid processed and shaped once more under normal temperature to form the inverted-hook groove around the side edge of the molded cup lid so that such a molded cup lid can tightly and closely combine with a primary cup body, sparing a process of thermal compression and thus saving cost of heat energy. In addition, either the method of directly compression shaping described in the first preferred embodiment, or the method of roller compressing and shaping mentioned in the second preferred embodiment or the method of air bag compressing and shaping shown in the third preferred embodiment can equally make a same inverted-hook groove for a plant-fiber molded cup lid.

While the preferred embodiments of the invention have been described above, it will be recognized and understood that various modifications may be made therein and the appended claims are intended to cover all such modifications that may fall within the spirit and scope of the invention.

What is claimed is:

1. A method of making an inverted-hook groove in a preformed plant fiber-molded cup lid comprising:

covering an outer side of a thermally compressed and shaped plant fiber molded cup lid with an outer mold converting a thermally compressed and shaped plant fiber-molded cup lid, said outer mold having a transversely annular slide groove at a place corresponding with a location where said molded lid is to be formed with an inverted-hook groove;

said annular slide groove receiving a set of shaping slide blocks therein, each of said slide block formed with a protruding-out shaping ridge at an inner edge;

said molded cup lid having a lower side receiving an inner mold that has a central portion receiving a material-propping block;

said inner mold and said material-propping block matching a shape of said molded cup lid;

said inner mold formed with an annularly inward-recessed receiving groove at a place corresponding with a location where said molded cup lid is to be formed with an inverted-hook groove, a shape of said receiving groove aligning with that of said shaping ridge;

during making said inverted-hook groove, said outer mold and said inner mold together with said material-propping block closed together first;

said slide blocks are pushed to move inward to let said shaping ridges resist the surface of said molded cup lid;

said shaping ridges continuously moved forward to make the surface of said molded cup lid deformed together with the shape of said shaping ridge and contracted into said receiving groove of said inner mold, thus forming the annularly inverted-hook groove; and separating said inner and outer mold and removing said molded cup lid with an annularly inverted-hook groove.

2. A method of making an inverted-hook groove for a plant fiber-molded cup lid as claimed in claim 1, wherein said slide blocks are pulled to withdraw outward, and said outer mold and said inner mold are opened reversely and said material-propping block is actuated to push out said molded cup lid with an inverted-hook groove after an annular inverted-hook groove is formed on the surface of said molded cup lid.

3. A method of making an inverted-hook groove for a plant fiber-molded cup lid as claimed in claim 1, wherein said shaping ridges of said slide blocks are conjoined into an annular shape when they are moved inward together.

* * * * *